(12) United States Patent
Kim

(10) Patent No.: US 7,703,975 B2
(45) Date of Patent: Apr. 27, 2010

(54) TEMPERATURE DETECTING CIRCUIT

(75) Inventor: Dong-Kyun Kim, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 194 days.

(21) Appl. No.: 11/819,869

(22) Filed: Jun. 29, 2007

(65) Prior Publication Data
US 2008/0036525 A1 Feb. 14, 2008

(30) Foreign Application Priority Data
Aug. 11, 2006 (KR) ...................... 10-2006-0076401

(51) Int. Cl.
*G01K 7/00* (2006.01)
(52) U.S. Cl. ...................... 374/170; 374/171
(58) Field of Classification Search ................ 374/170, 374/171, 166
See application file for complete search history.

(56) References Cited
U.S. PATENT DOCUMENTS

| | | | |
|---|---|---|---|
| 5,875,416 A * | 2/1999 | Kanno | ........................ 702/130 |
| 6,531,911 B1 | 3/2003 | Hsu et al. | |
| 6,876,250 B2 | 4/2005 | Hsu et al. | |
| 7,138,823 B2 | 11/2006 | Janzen et al. | |
| 2006/0111865 A1 | 5/2006 | Choi | |
| 2006/0158214 A1 | 7/2006 | Janzen et al. | |
| 2007/0040574 A1 | 2/2007 | Janzen et al. | |
| 2007/0098042 A1 * | 5/2007 | Choi et al. | ................... 374/170 |
| 2007/0213882 A1 * | 9/2007 | Inukai et al. | ................ 700/300 |
| 2008/0267258 A1 * | 10/2008 | Hokenmaier | ................ 374/166 |
| 2008/0316482 A1 * | 12/2008 | Hoshizaki et al. | ........... 356/317 |

FOREIGN PATENT DOCUMENTS

| | | | |
|---|---|---|---|
| JP | 04273030 A | * | 9/1992 |
| JP | 10255467 | | 9/1998 |
| KR | 20-1991-0020695 | | 5/1991 |
| KR | 10-1999-0048860 | | 7/1999 |
| KR | 1020000068726 | | 11/2000 |
| KR | 100569555 | | 4/2006 |

* cited by examiner

*Primary Examiner*—Andre J Allen
(74) *Attorney, Agent, or Firm*—Venable LLP; Jeffri A. Kaminski

(57) ABSTRACT

A temperature detecting circuit includes a temperature detecting unit that generates a first temperature detecting signal according to a temperature. A temperature information control unit generates a control signal by the first temperature detecting signal, supplies the control signal to the temperature detecting unit, and generates a second temperature detecting signal by the control signal and the first temperature detecting signal. A temperature information output unit generates a temperature information signal in accordance with the second temperature detecting signal and the control signal.

21 Claims, 3 Drawing Sheets

US 7,703,975 B2

TEMPERATURE DETECTING CIRCUIT

CROSS-REFERENCE TO RELATED PATENT APPLICATION

This application claims the benefit of Korean Patent Application No. 10-2006-0076401, filed on Aug. 11, 2006, in the Korean Intellectual Property Office, the disclosure of which is incorporated herein in its entirety by reference.

BACKGROUND OF THE INVENTION

1. Technical Field

The present invention relates to a semiconductor integrated circuit, and more particularly, to a temperature detecting circuit that is installed in a semiconductor integrated circuit.

2. Related Art

In general, in semiconductor elements, for example, transistors, operation characteristics thereof are changed according to temperature. In particular, in semiconductor memory apparatuses, such as DRAMs, since data leaks as time elapses, a refresh operation needs to be performed. A refresh characteristic depends on the temperature.

Accordingly, in recent years, a semiconductor memory apparatus includes a temperature detecting circuit estimating a data leaking speed and a refresh timing according to the detected temperature.

A conventional temperature detecting circuit may include a temperature detecting unit and an output unit. The temperature detecting unit detects the temperature data and generates a temperature detecting signal according to the temperature data. The output unit generates a temperature information in response to the temperature detecting signal.

However, as a semiconductor memory apparatus operates with low power, an amplification voltage, which is supplied by the output unit, does not reach a desired potential level. That is, even when the change in the temperature is detected and the temperature is converted and amplified into a potential level, the potential level is amplified at low power. As a result, the change in the temperature is not reliably represented by a potential level. Thus, the conventional temperature detecting circuit cannot reliably reflect the change in the temperature in the semiconductor integrated circuit.

SUMMARY OF THE INVENTION

Embodiments of the present invention provide a temperature detecting circuit that is capable of accurately measuring a temperature in a semiconductor memory apparatus driven with a low voltage.

An embodiment of the present invention provides a temperature detecting circuit that includes a temperature detecting unit configured to generate a first temperature detecting signal according to a temperature, a temperature information control unit configured to generate a control signal by the first temperature detecting signal, supply the control signal to the temperature detecting unit, and generate a second temperature detecting signal by the control signal and the first temperature detecting signal, and a temperature information output unit configured to generate a temperature information signal in accordance with the second temperature detecting signal and the control signal.

DESCRIPTION OF EXEMPLARY EMBODIMENTS

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 1:
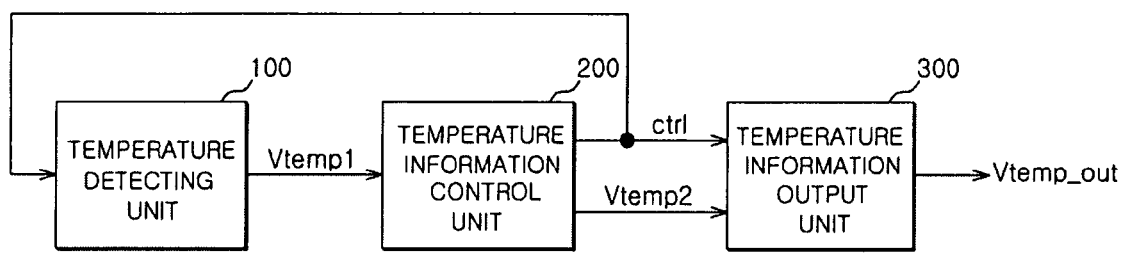
FIG. 1 is a block diagram illustrating a temperature detecting circuit of a semiconductor integrated circuit according to an embodiment of the present invention.

Referring to FIG. 1, a temperature detecting circuit according to an embodiment of the present invention includes a temperature detecting unit 100, a temperature information control unit 200, and a temperature information output unit 300.

Figure 2:
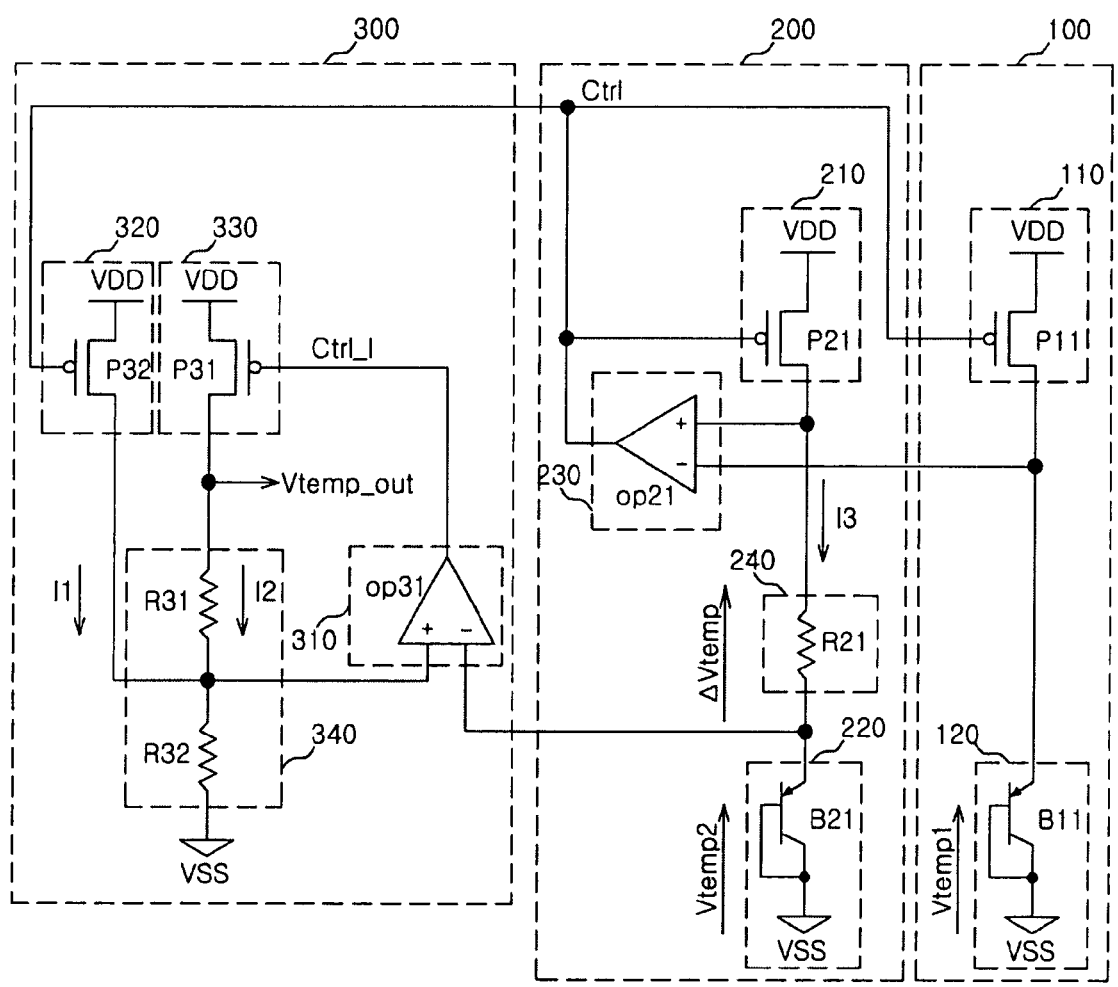
FIG. 2 is a circuit diagram illustrating a detailed structure of a temperature detecting circuit of a semiconductor integrated circuit according to an embodiment of the present invention.

The temperature detecting unit 100 generates a first temperature detecting signal Vtemp1 in accordance with a temperature control signal Ctrl that is supplied by the temperature information control unit 200. As shown in FIG. 2, the temperature detecting unit 100 includes a first voltage supply unit 110 and a first temperature sensor 120.

The first voltage supply unit 110 changes an output voltage of the temperature detecting unit 100 according to a potential level of the temperature control signal Ctrl. The first voltage supply unit 110 may be a first transistor P11 that has a gate receiving the temperature control signal Ctrl, a source supplied with an external voltage from an external power supply VDD, and a drain connected to the first temperature sensor 120.

The first temperature sensor 120 receives an output signal from the first voltage supply unit 110, to output the first temperature detecting signal Vtemp1. The first temperature sensor 120 includes a first bipolar transistor B11 that has an emitter supplied with an output voltage of the first voltage supply unit 110, and a base and a collector commonly connected to a ground terminal Vss. The first temperature detecting signal Vtemp1, which is an emitter-collector voltage VEB1 of the first bipolar transistor, becomes a voltage of a contact node of the first voltage supply unit 110 and the first temperature sensor 120.

The temperature information control unit 200 generates the temperature control signal Ctrl in accordance with the first temperature detecting signal Vtemp1, and generates a second temperature detecting signal Vtemp2 in accordance with the temperature control signal Ctrl. This temperature information control unit 200 includes a second voltage supply unit 210, a second temperature sensor 220, a control signal generating unit 230, and a voltage converting unit 240.

In the second voltage supply unit 210, an output voltage thereof is changed according to the potential level of the temperature control signal Ctrl. The second voltage supply unit 210 is a second transistor P21 that has a gate receiving the temperature control signal Ctrl, a source connected to the external power supply VDD, and a drain connected to the control signal generating unit 230 and the voltage converting unit 240. At this time, a size of the first transistor P11 may be 'a' times larger than a size of the second transistor P21.

The second temperature sensor 220 is supplied with a voltage from the voltage converting unit 240, and generates a second temperature detecting signal Vtemp2 that serves as a voltage reflecting a current temperature. The second temperature sensor 220 includes a second bipolar transistor B21 that has an emitter connected to the voltage converting unit 240, and a base and a collector commonly connected to the ground terminal Vss. In this case, the second temperature detecting signal Vtemp2 becomes an emitter-collector voltage VEB2 of the second bipolar transistor B21. Thus, the second temperature detecting signal Vtemp2 may be measured at a contact between the voltage converting unit 240 and the second temperature sensor 220. The size of the first bipolar transistor B11 may be '1/N' of the size of the second bipolar transistor B21.

The control signal generating unit 230 generates the temperature control signal Ctrl in accordance with the first temperature detecting signal Vtemp1. The control signal generating unit 230 receives a potential level of the first temperature detecting signal Vtemp1 and the output voltage of the second voltage supply unit 210, to generate the temperate control signal Ctrl. At this time, the temperature control signal Ctrl is obtained by the difference between the potential level of the first temperature detecting signal Vtemp1 and the output voltage of the second voltage supply unit 210. The control signal generating unit 230 is a first operational amplifier OP21 that has a first input terminal (−) and a second input terminal (+). Specifically, the control signal generating unit 230 is the first operational amplifier OP21 in which the first temperature detecting signal Vtemp1 is input to the first input terminal (−) and the output voltage of the second voltage supply unit 210 is applied to the second input terminal (+).

The voltage converting unit 240 drops the output voltage of the second voltage supply unit 210. A first resistor R21 may be used as the voltage converting unit 240. The voltage converting unit 240 may be connected between the second voltage supply unit 210 and the second temperature sensor 220. The voltage converting unit 240 is supplied with a difference voltage ΔVtemp between the first temperature detecting signal Vtemp1 and the second temperature detecting signal Vtemp2. As a result, a current I3 that corresponds to the difference voltage ΔVtemp flows through the voltage converting unit 240.

The temperature information output unit 300 generates a temperature information signal Vtemp_out that has a potential level corresponding to the second temperature detecting signal Vtemp2 and the temperature control signal Ctrl. The temperature information output unit 300 includes a current control signal generating unit 310, a first current adjusting unit 320, a second current adjusting unit 330, and a temperature information signal generating unit 340.

The current control signal generating unit 310 is an operational amplifier OP31 that has a first input terminal (−) and a second input terminal (+). Specifically, the current control signal generating unit 310 is the operational amplifier OP31 in which the second temperature detecting signal Vtemp2 is applied to the first input terminal − and the voltage of the temperature information signal generating unit 340 is applied to the second input terminal +, and a current control signal Ctrl_I is output. At this time, the second temperature detecting signal Vtemp2 that is applied to the first input terminal − of the second operational amplifier OP31 may have the same potential level as the voltage applied to the second input terminal +.

The first current adjusting unit 320 controls intensity of a first current I1 according to a potential level of the temperature control signal Ctrl. The first current adjusting unit 320 includes a third transistor P32 that has a gate receiving the temperature control signal Ctrl, a source supplied with the external voltage from the external power supply VDD, and a drain connected to the temperature information signal generating unit 340. The third transistor P32 may have the same size as the second transistor P21 that constitutes the second voltage supply unit 210.

The second current adjusting unit 330 controls the intensity of a second current I2 according to the potential level of the current control signal Ctrl_I. The second current adjusting unit 330 includes a fourth transistor P31 that has a gate receiving the current control signal Ctrl_I, a source supplied with the external voltage from the external power supply VDD, and a drain connected to the temperature information signal generating unit 340.

The temperature information signal generating unit 340 determines a potential level of the temperature information signal Vtemp_out in response to the intensities of the first current I1 and the second current I2. The temperature information signal generating unit 340 includes a second resistor R31 and a third resistor R32 which are connected in series to each other. That is, the second resistor R31 is connected between the second current adjusting unit 330 and the third resistor R32, and the third resistor R32 is connected between the second resistor R31 and the ground terminal Vss. At this time, the temperature information signal Vtemp_out may be determined by a total resistance value of the second resistor R31 and the third resistor R32 and the intensity of the second current I2. The temperature information signal Vtemp_out is output from a node between the second current adjusting unit 330 and the temperature information signal generating unit 340.

In this case, the current control signal Ctrl_I may be determined according to the voltage difference between the second temperature detecting signal Vtemp2 and a voltage applied to the third resistor R32. Further, each of the first to fourth transistors P11, P21, P31, and P32 in this embodiment may be composed of a PMOS transistor, and each of the first and second bipolar transistors B11 and B21 may be composed of a PNP-type transistor.

The temperature detecting circuit according to an embodiment of the present invention that has the above-described structure performs the following operation.

First, potential levels of the first temperature detecting signal Vtemp1 and the second temperature detecting signal Vtemp2 may be changed according to the temperature. Therefore, a voltage that corresponds to a potential difference between the first temperature detecting signal Vtemp1 and the second temperature detecting signal Vtemp2 is applied to a first resistive element R21. At this time, the intensity of the third current I3 that flows through the first resistive element R21 is represented by Equation 1.

$$I3 = (Vtemp1 - Vtemp2)/R21 \quad \text{[Equation 1]}$$

At this time, since the second bipolar transistor B21 is designed to be 'N' times larger than the first bipolar transistor B11, the voltage difference between the emitter-base voltage $V_{EB1}$ of the first bipolar transistor B11 and the emitter-base voltage $V_{EB2}$ of the second bipolar transistor B21 is represented by Equation 2.

$$\Delta V_{BE} = Vt \times \ln(N) \quad \text{[Equation 2]}$$

In this case, Vt denotes a constant called a thermal voltage, and satisfies the condition Vt=KT/q. K denotes a Boltzmann constant which is $1.38\times10^{-23}$ Joule/Kelvin, T indicates an absolute temperature (273°+C.°) called Kelvin, and q indicates a quantity of electric charge of an electron ($1.602\times10^{-19}$ C).

At this time, since the first transistor P11 is designed to be "a" times larger than the second transistor P21, the potential difference between the first temperature detecting signal Vtemp1 and the second temperature detecting signal Vtemp2 is represented by Equation 3.

$$\Delta Vtemp(Vtemp1-Vtemp2)=Vt\times\ln(a\times N) \quad \text{[Equation 3]}$$

Therefore, the third current I3 that flows through the voltage converting unit 240 is represented by Equation 4.

$$I3=Vt\times\ln(a\times N)/R21 \quad \text{[Equation 4]}$$

Therefore, the intensity of the third current I3 is in proportion to the temperature.

Further, the second transistor P21 is designed to have the same size as the third transistor P32, and the same temperature control signal Ctrl and the same external voltage from the external power supply VDD are applied to the gate and the source of each of the second transistor P21 and the third transistor P32. Therefore, the first and third currents I1 and I3 that are supplied by the second and third transistors P21 and P32 become substantially the same.

Meanwhile, in the second operational amplifier OP31 that serves as the current control signal generating unit 310, the output terminal and the second input terminal (+) are connected to each other by the fourth transistor P31 and the second resistor R31. As a result, since the output value of the second operational amplifier OP31 is fed back as the input value, the potential levels at the first input terminal (−) and the second voltage terminal (+) of the second operational amplifier OP31 become the same. Therefore, the potential level of the second temperature detecting signal Vtemp2 becomes the same as a potential level of the voltage that is applied to the third resistor R32.

Accordingly, a current that corresponds to a total intensity of the first current I1 and the second current I2 flows through the third resistor R32, and as the result of it, a voltage is applied to the third resistor R32. At this time, the voltage that is applied to the third resistor R32 is equal to the voltage of the second temperature detecting signal Vtemp2, which is represented by Equation 5.

$$(I1+I2)\times R32=Vtemp2$$

$$I2=Vtemp2/R32-I1 \quad \text{[Equation 5]}$$

On the basis of Equations 1 to 5, the output voltage of the temperature detecting circuit according to the embodiment of the present invention is defined by Equation 6.

$$Vtemp\_out=Vtemp2\times(R31+R32)/R32-Vt\times\ln(a\times N)\times R31/R21 \quad \text{[Equation 6]}$$

From Equation 6, the output voltage of the temperature detecting circuit according to the embodiment of the present invention has a value that is obtained by subtracting Vtemp2×(R31+R32)/R32 (output voltage obtained from the temperature detecting circuit according to the related art) by Vt×ln(a×N)×R31/R21. Thus, the temperature detecting circuit according to an embodiment of the present invention can be constructed such that the voltage change of the temperature detecting signal according to the temperature change is larger than that according to the related art.

Figure 3:
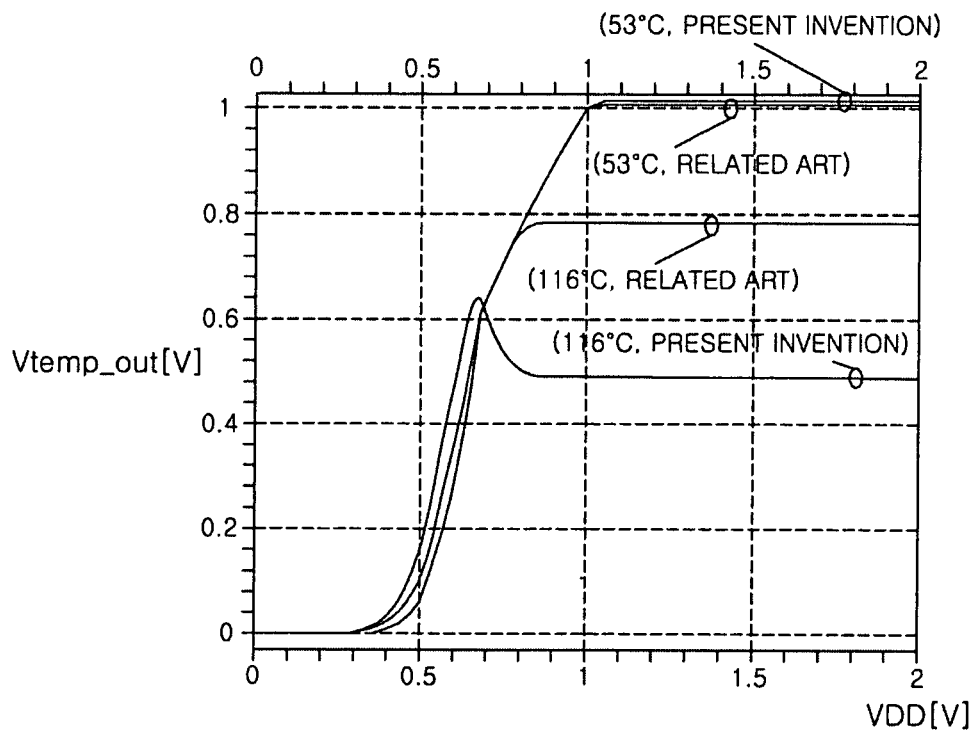
FIGS. 3 and 4 are graphs illustrating output voltages according to a change in a temperature in a temperature detecting circuit according to a conventional temperature detecting circuit and a temperature detecting circuit according to an embodiment of the present invention.
Figure 4:
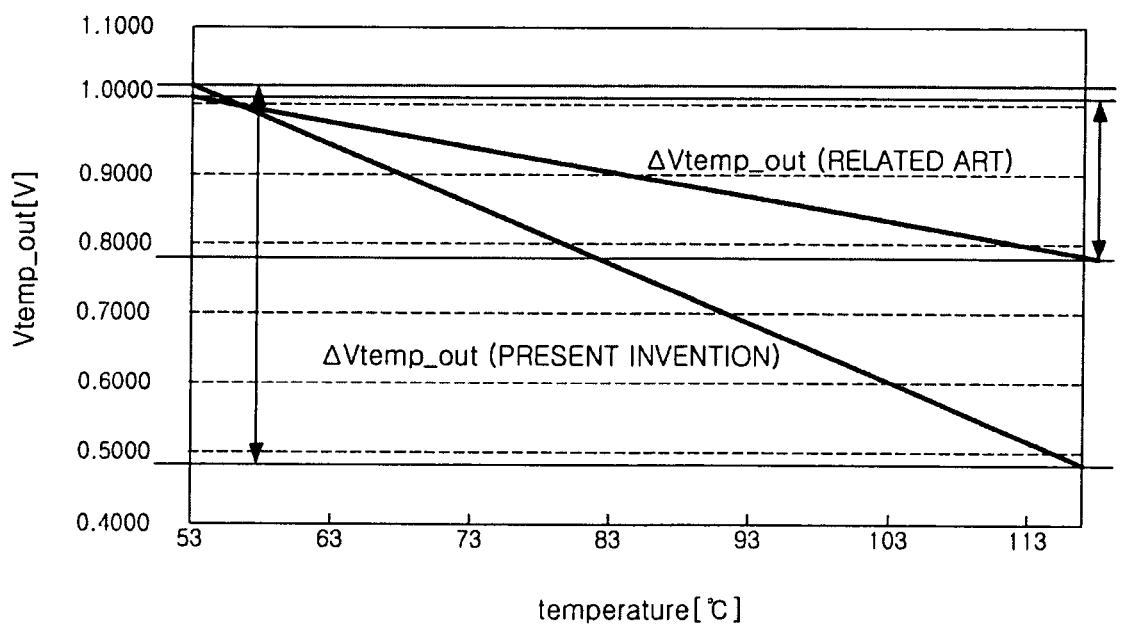

FIGS. 3 and 4 are graphs illustrating output voltages according to a temperature in a temperature detecting circuit according to the related art and a temperature detecting circuit according to an embodiment of the present invention.

Referring to FIG. 3, it can be understood that the difference in a potential level between the temperature information signal according to the related art and the temperature information signal Vtemp_out according to an embodiment of the present invention rarely exists at a relatively low temperature of 53° C. Meanwhile, it can be understood that the difference in a potential level between the temperature detecting signals Vtemp_out is large at a relatively high temperature of 116° C. It shows that in the temperature information signal according to the related art, a voltage change according to the temperature change is large, as compared with the temperature information signal Vtemp_out according to the embodiment of the present invention.

Referring to FIG. 4, as the temperature rises, the temperature information signal Vtemp_out according to an embodiment of the present invention has a lower potential level than the temperature information signal according to the related art. It shows that the temperature detecting circuit according to an embodiment of the present invention outputs the temperature information signal Vtemp_out having a large voltage change according to the temperature change, as compared with the temperature detecting circuit according to the related art. As such, when the temperature detecting circuit according to an embodiment of the present invention is applied to the semiconductor integrated circuit, it is possible to obtain accurate temperature information, as compared with the related art. Even when a potential level of the voltage that is applied to the temperature detecting circuit according to an embodiment of the present invention is lowered, the difference between a maximum value and a minimum value of the temperature information signal is sufficiently large, thereby accurately measuring the temperature.

It will be apparent to those skilled in the art that various modifications and changes may be made without departing from the scope and spirit of the invention. Therefore, it should be understood that the above embodiments are not limitative, but illustrative in all aspects. The scope of the invention is defined by the appended claims rather than by the description preceding them, and therefore all changes and modifications that fall within metes and bounds of the claims, or equivalents of such metes and bounds are therefore intended to be embraced by the claims.

What is claimed is:

1. A temperature detecting circuit comprising:
    a temperature detecting unit configured to generate a first temperature detecting signal according to a temperature and a control signal;
    a temperature information control unit configured to generate the control signal based on the first temperature detecting signal, supply the control signal to the temperature detecting unit, and generate a second temperature detecting signal based on the control signal and the first temperature detecting signal; and
    a temperature information output unit configured to generate a temperature information signal in accordance with the second temperature detecting signal and the control signal wherein the temperature detecting unit includes:
    a voltage supply unit configured to output a changed voltage according to a potential level of the control signal; and
    a temperature sensor configured to receive the changed voltage from the voltage supply unit to generate the first temperature detecting signal having a potential level corresponding to the temperature.

2. The temperature detecting circuit of claim 1,
wherein the voltage supply unit is a MOS transistor that includes a gate receiving the control signal, a source supplied with an external voltage, and a drain connected to the temperature sensor.

3. The temperature detecting circuit of claim 1,
wherein the temperature sensor is a bipolar transistor that includes an emitter supplied with the changed voltage output from the voltage supply unit, and a base and a collector commonly connected to a ground terminal.

4. The temperature detecting circuit of claim 3,
wherein the first temperature detecting signal is a voltage between the emitter and the collector of the bipolar transistor.

5. The temperature detecting circuit of claim 1,
wherein the temperature information control unit includes:
a control signal generating unit configured to generate the control signal based on the first temperature detecting signal from the temperature detecting unit;
a voltage supply unit configured to output a changed voltage according to a potential level of the control signal;
a voltage converting unit configured to drop the changed voltage output of the voltage supply unit to obtain an output voltage; and
a temperature sensor configured to receive the output voltage of the voltage converting unit and generate the second temperature detecting signal according to the temperature.

6. The temperature detecting circuit of claim 5,
wherein the voltage supply unit is a MOS transistor that includes a gate receiving the control signal, a source supplied with an external voltage, and a drain connected to the voltage converting unit.

7. The temperature detecting circuit of claim 5,
wherein the control signal generating unit makes the first temperature detecting signal and the changed voltage output of the voltage supply unit have the same potential level, to generate the control signal.

8. The temperature detecting circuit of claim 7,
wherein the control signal generating unit is an operational amplifier that includes a first input terminal receiving the first temperature detecting signal and a second input terminal supplied with the changed voltage output of the voltage supply unit.

9. The temperature detecting circuit of claim 5,
wherein the voltage converting unit is a resistor connected between the voltage supply unit and the temperature sensor.

10. The temperature detecting circuit of claim 5,
wherein the temperature sensor is a bipolar transistor that includes an emitter receiving the output voltage of the voltage converting unit, and a base and a collector commonly connected to a ground terminal.

11. The temperature detecting circuit of claim 10,
wherein the second temperature detecting signal is an emitter-collector voltage of the bipolar transistor.

12. The temperature detecting circuit of claim 1,
wherein the temperature information output unit includes:
a first current adjusting unit configured to control intensity of a first current according to a potential level of the control signal;
a second current adjusting unit configured to control intensity of a second current according to a potential level of a current control signal;
a temperature information signal generating unit configured to determine a potential level of the temperature information signal in response to the intensities of the first current and the second current; and
a current control signal generating unit configured to generate the current control signal according to a potential level of the second temperature detecting signal.

13. The temperature detecting unit of claim 12,
wherein the first current adjusting unit is a MOS transistor that includes a gate receiving the control signal, a source supplied with an external voltage, and a drain connected to the temperature information signal generating unit, and wherein
the drain of the MOS transistor generates the first current.

14. The temperature detecting unit of claim 12,
wherein the first current adjusting unit is a MOS transistor that includes a gate receiving the current control signal, a source supplied with an external voltage, and a drain connected to the temperature information signal generating unit, and wherein
the drain of the MOS transistor generates the second current.

15. The temperature detecting circuit of claim 12,
wherein the temperature information signal generating unit includes first and second resistors that are connected in series between the second current adjusting unit and a ground terminal, and wherein
the potential level of the temperature information signal is determined according to a total resistance value of the first and second resistors and the intensity of the second current.

16. The temperature detecting circuit of claim 15,
wherein the second current flows through the first resistor, and
the first and second currents flow through the second resistor.

17. The temperature detecting circuit of claim 12,
wherein the current control signal generating unit makes the second temperature detecting signal and an output voltage of the temperature information signal generating unit the same, to determine the current control signal.

18. The temperature detecting circuit of claim 17,
wherein the current control signal generating unit is an operational amplifier that has a first input terminal receiving the second temperature detecting signal and a second input terminal supplied with the output voltage of the temperature information signal generating unit, wherein the output voltage of the temperature information signal generating unit is a voltage corresponding to the intensity of a current flowing through a second resistive element.

19. The temperature detecting circuit of claim 1,
wherein a MOS transistor of the temperature detecting unit is larger than a MOS transistor of the temperature information control unit.

20. The temperature detecting circuit of claim 1,
wherein a bipolar transistor of the temperature detecting unit is smaller than a bipolar transistor of the temperature information control unit.

21. The temperature detecting circuit of claim 1,
wherein a MOS transistor of the temperature information control unit has the same size as a MOS transistor that serves as a first current adjusting unit of the temperature information output unit.

* * * * *